(12) United States Patent
Vivona et al.

(10) Patent No.: US 10,467,589 B2
(45) Date of Patent: Nov. 5, 2019

(54) SYSTEMS AND METHODS FOR PROFILED AND FOCUSED SEARCHING OF LITIGATION INFORMATION

(75) Inventors: Michele Vivona, Seattle, WA (US); Donald G. Peterson, Kirkland, WA (US); Jeffrey Pfeifer, Denver, CO (US); Kevin Stehr, Charleston, SC (US); David Dilenschneider, Centennial, CO (US); John Nash, San Rafael, CA (US); William Hagy, Radnor, PA (US); Duane Wald, Kent, WA (US); Ryan Sanders, Kent, WA (US); Travis J. Olson, Snoqualmie, WA (US)

(73) Assignee: RELX INC., New York, NY (US)

( * ) Notice: Subject to any disclaimer, the term of this patent is extended or adjusted under 35 U.S.C. 154(b) by 925 days.

(21) Appl. No.: 12/010,777

(22) Filed: Jan. 30, 2008

(65) Prior Publication Data
US 2009/0083328 A1    Mar. 26, 2009

Related U.S. Application Data

(60) Provisional application No. 60/898,720, filed on Feb. 1, 2007.

(51) Int. Cl.
*G06F 7/00* (2006.01)
*G06Q 10/10* (2012.01)
(Continued)

(52) U.S. Cl.
CPC ............. *G06Q 10/10* (2013.01); *G06Q 50/18* (2013.01); *G06F 16/338* (2019.01)

(58) Field of Classification Search
CPC .................................................... G06F 16/338
(Continued)

(56) References Cited

U.S. PATENT DOCUMENTS

| 190,490 A | 5/1877 | Hock et al. |
| 5,903,646 A * | 5/1999 | Rackman ............ G06F 21/6218 380/54 |

(Continued)

OTHER PUBLICATIONS

Canadian Intellectual Property Office, Notice of Allowance, dated Nov. 22, 2016.
(Continued)

*Primary Examiner* — Eliyah S. Harper
(74) *Attorney, Agent, or Firm* — Dinsmore & Shohl LLP

(57) ABSTRACT

Systems and methods for profiled and focused searching of litigation information allow a user to access specific legal information for use during litigation. The user can connect to a web site and access particular information from multiple sources based on the litigation task the user wishes to accomplish One litigation task is to create a litigation profile for a target, such as a particular litigant, attorney, judge, court, or firm. In this way, the user can perform focused and task-based searching to receive information about particular filings in particular locations, made by particular entities without knowing which sources contain certain pieces of the litigation information. For example, the user can receive all documents relating to summary judgment for patent infringement filed by a particular attorney in a particular court without specifying the source of information. In one aspect, the user can also access the source(s) upon receiving the results.

21 Claims, 8 Drawing Sheets

(51) Int. Cl.
*G06Q 50/18* (2012.01)
*G06F 16/338* (2019.01)

(58) Field of Classification Search
USPC .................................. 707/999.01, 769, 942
See application file for complete search history.

(56) References Cited

U.S. PATENT DOCUMENTS

| | | | |
|---|---|---|---|
| 6,901,404 B1* | 5/2005 | Bonutti | G06Q 50/18 |
| 7,043,489 B1* | 5/2006 | Kelley | G06Q 10/10 |
| 7,668,807 B2* | 2/2010 | Dettinger | G06F 16/2452 |
| | | | 707/718 |
| 2002/0120464 A1* | 8/2002 | Kirk | G06Q 50/18 |
| | | | 705/51 |
| 2002/0143595 A1* | 10/2002 | Frank | G06Q 10/06 |
| | | | 705/311 |
| 2005/0240578 A1* | 10/2005 | Biederman, Sr. | G06F 16/93 |
| 2006/0020622 A1* | 1/2006 | Shelton | G06F 21/6245 |
| 2006/0080278 A1* | 4/2006 | Neiditsch et al. | 707/1 |
| 2006/0101382 A1* | 5/2006 | Jeffries | G06Q 10/10 |
| | | | 717/104 |
| 2006/0129593 A1* | 6/2006 | Slovak | G06F 17/30616 |
| 2006/0190434 A1* | 8/2006 | Dettinger et al. | 707/3 |
| 2006/0190490 A1 | 8/2006 | Ritchey | |
| 2006/0229999 A1* | 10/2006 | Dodell | G06Q 10/10 |
| | | | 705/80 |
| 2006/0277054 A1* | 12/2006 | Benzrihem | G06Q 30/02 |
| | | | 705/80 |
| 2007/0005637 A1* | 1/2007 | Juliano | G06Q 10/10 |
| 2008/0033904 A1* | 2/2008 | Ghielmetti | G06F 16/93 |

OTHER PUBLICATIONS

Canadian Intellectual Property Office, Office Action, dated Dec. 29, 2015.
Canadian Intellectual Property Office, Office Action, dated Jan. 14, 2015.
Australia Government IP Australia, Patent Examination Report No. 2, dated Oct. 24, 2013, Woden, Australia.
Australia Government IP Australia, Patent Examination Report No. 1, dated Oct. 5, 2012, Woden, Australia.

* cited by examiner

SYSTEMS AND METHODS FOR PROFILED AND FOCUSED SEARCHING OF LITIGATION INFORMATION

CROSS REFERENCE TO RELATED APPLICATIONS

This application claims priority to Provisional Application Ser. No. 60/898,720, entitled "Total Litigator," filed Feb. 1, 2007.

FIELD OF THE INVENTION

The invention relates generally to improved systems and methods for searching and providing directed litigation information to a user, and specifically to task-based and profiled searching of litigation information.

BACKGROUND OF THE INVENTION

The litigation services market is comprised of various products and services used by legal professionals, before, during, and after litigation. Various research services allow a user to locate legal information, such as cases, pleadings, publications, and more, over the Internet. Such tools generally provide users, such as lawyers, legal staff, and other individuals, with a means to look up information that is helpful and often necessary for litigation-related activities.

Typically, a user chooses between various services or databases when searching for a particular piece of information. Each database can contain different information types. For example, while one database may contain all Federal Court decisions, another database contains legal periodicals. When the user seeks specific information, they must navigate to the appropriate service or database and search within that source for the needed information.

While existing litigation services are extremely helpful, room for improvement still exists. For example, if the user does not know which combination of services provide the needed information, the user may waste time and money navigating options or performing searches that do not return optimal results.

In some cases, the user may have to use multiple services to receive all the desired information, requiring the user to visit multiple locations or learn how to master several different search tools. Additionally, keeping track of the many services and their offerings can be a cumbersome undertaking. This is especially true in view of the constant evolution of litigation services and other sources of litigation information.

Accordingly, an object of the embodiments discussed herein is to provide systems and methods for profiled and focused searching of litigation information. Some embodiments allow a user to search for specific litigation information across several services based on the user's litigation task rather than the limitations of a particular source of the information, as follows.

SUMMARY

In accordance with various embodiments herein, systems and methods for profiled and focused searching of litigation information are provided.

In one aspect, a method is described for searching litigation information to create a litigation profile for a target. The method begins with receiving a profile request containing a first user selection of at least one of a plurality of potential targets. The targets, for example, may include a particular litigant, attorney, an expert, a judge, a court, or a law firm. The method identifies a first source that contains a first type of information related to the received profile request and requests the first type of information from the first source. After receiving the first type of information from the first source, the method creates the litigation profile for the target based upon the first type of information and transmits the litigation profile for the target to the user.

In another aspect, a method is described for task-based searching of litigation information. The method returns litigation information to the user that likely will help the user complete the task. The method begins with receiving a task selection from a user. The task selection indicates the type of work product that the user wishes to create, and is chosen from a plurality of different tasks. Next, the method identifies a first source for retrieving a first type of litigation information related to the task selection. The first source is identified among a plurality of sources, at least some of those sources containing different types of litigation information. After the first source is identified, the method includes a step of requesting the first type of litigation information from the first source. Then the first type of litigation information is received from the first source and transmitted to the user.

In yet another aspect, a system for providing task-based litigation information to a user is described. The system comprises a storage medium for storing user preferences, a server in communication with the storage medium, and an interface coupled to the server and a network. In one embodiment, the interface receives a litigation task selection from a user over the network. The task selection indicates a type of work product that the user wishes to create, and is chosen from a plurality of different tasks. The server is operative to receive the litigation task selection through the interface and utilize the request to perform several steps. First, the server can determine a first source of information relevant to the litigation task selection. Then the server can derive a first search criterion from the litigation task selection and query the first source by using the first search criterion. The server then sends a result to the user, including at least some information from the first source.

In still another aspect, a computer-readable medium is described. The computer-readable medium can contain instructions for execution by a processor, the instructions causing the processor to perform stages for a task-based search. The stages include receiving a task selection from a user. The task selection indicates a need to create a work product related to a particular part of a litigation. The processor then identifies a first source of information useful in creating the work product and queries the first source using a criterion derived from the task selection. Then, a result from the querying is sent to the user.

It is to be understood that both the foregoing general description and the following detailed description are exemplary and explanatory only and are not restrictive of the embodiments, as claimed.

The accompanying drawings, which are incorporated in and constitute a part of this specification, illustrate several embodiments and together with the description, serve to explain the principles of the embodiments.

DESCRIPTION OF THE EMBODIMENTS

Figure 1:
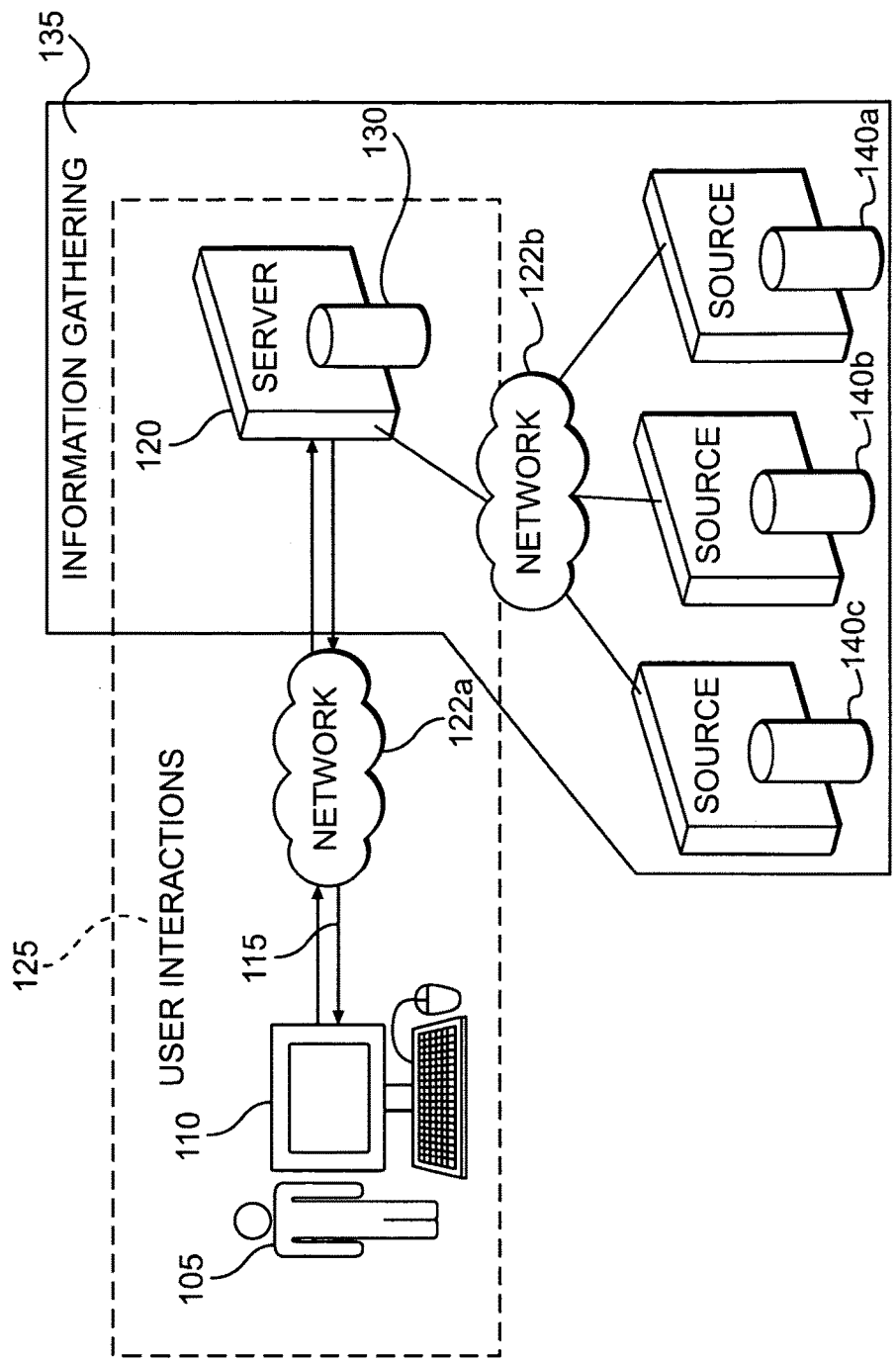
FIG. 1 is an overview diagram of exemplary components used to provide task-based litigation information and/or a litigation profile to a user in accordance with an embodiment of the present invention.

Reference will now be made in detail to the present exemplary embodiments, examples of which are illustrated in the accompanying drawings. Wherever possible, the same reference numbers will be used throughout the drawings to refer to the same or like parts.

It is to be understood that both the foregoing background description and the following detailed description are exemplary and explanatory only and are not restrictive of the embodiments as claimed.

As used herein, a server includes any system capable of receiving communications from a user from over a network, such as the Internet, intranet, local area network, telecommunications network, and/or Ethernet. The server can comprise one or more processing units and/or include components spread across multiple locations.

Additionally, litigation information includes any information helpful in drafting or creating work product relating to litigation. Examples include any type of legal document filed with the court, statements or opinions issued by a court, writings regarding a legal topic, docket information, financial information, public records data, news articles, litigation-related statistics, and profile information pertaining to a litigant, attorney, expert, judge, or law firm, among other information.

An embodiment described below allows a user to perform a task-based search for litigation information. For example, a user connects to a server over a network, such as the Internet. Through a web browser or other user interface, a server presents a user with various tasks that are part of litigation workflow. When the user selects a task, the server can determine which sources of litigation information likely would be helpful to the user in completing the task. Often, the relevant litigation information is spread across multiple information sources, such as databases and services external from the server. In one embodiment, after the server determines which sources to search, the user may eliminate particular sources before executing the search. When the search is executed, the system may query the sources and return a focused result to the user. This method provides a task-based search multiple sources, without requiring the user to know which sources to search. The user can retrieve focused litigation information relevant to the task. As a result, the user can more easily and efficiently arm themselves with all the litigation information needed when creating a particular work product.

In another embodiment, the system allows a user to perform a particular type of task-based and focused search that creates and returns a litigation profile for a target, such as a particular litigant, attorney, expert, judge, and/or law firm. These profiles can give a user a tactical advantage in preparing litigation-related work product. For example, a user can readily analyze an opponent's past strategies, background financial information or a judge's experience in hearing a particular type of issue. Because the system can query multiple sources for the litigation information, the litigation profile can include relevant details about the profiled litigant, attorney, judge, or law firm accumulated across a plurality of sources. In this way, the system provides a wide range of information on a narrow topic. Additionally, the litigation profile can be narrowed even further, such as by practice area and document type, in another implementation.

Task-based searching of litigation information can save the user valuable time in completing a litigation task. Rather than scouring various sources for litigation information, as traditionally done, the server makes focused use of the context of the selected task and determines which sources to search so that it can more efficiently provide the user with the needed information.

Additionally, the user need not even know where to find the litigation information. The system can automatically determine the sources for the user based on the litigation task. This allows users to readily use sources they would not otherwise have thought to use. At the very least, it relieves users from having to constantly keep track of which sources contain particular types of litigation information.

An embodiment can also save the user money by increasing workflow performance. Because the server can identify numerous sources of litigation information for a given litigation task, the user no longer will have to identify and independently navigate these sources. Therefore, the user can concentrate efforts more on work product creation and less on the research aspects of the task.

An embodiment can also provide clear insight to the user during the research process. The litigation content and functionality is easily accessible to the user, and the user can tell which sources are likely to help complete a given litigation task.

FIG. 1 is an overview diagram of exemplary components used for profiled and focused searching of litigation information in accordance with an embodiment of the present invention. Exemplary components for user interactions are illustrated in box 125. In general, a user 105 uses a user device 110 to communicate with a server 120 over network 122a. In one embodiment, the user 105 selects a task from a plurality of tasks presented on a user interface on user device 110. The task indicates a litigation work product that the user 105 and/or someone else wishes to draft or complete. Alternatively, the user may request a profile of an entity, or this profile may be associated with the selected task. In one embodiment, creation of a profile can be considered a type of task, selectable by the user.

After the user makes their selection, the server 120 then receives the selected task and/or profile request. Exemplary components for gathering information corresponding to a task selection and/or profile request are illustrated in box 135. Based on the task selection or profile request, the server 120 determines which source(s) 140a, 140b, and 140c, may have information relevant to the task and/or profile. The server queries some or all of these sources, and returns litigation information to the user 105.

The user device 110 can be a personal computer, laptop, portable electronic device, PDA, cellular phone, or any other device capable of displaying a user interface and communicating with a server 120 over a network 122a. In one embodiment, the user device 110 runs a client application that includes the user interface. In another embodiment, the user interface is accessed via a network, and is displayed, for example, in the user's web browser.

The network 122a may include, for example, the global Internet. Alternatively or in addition, the network 122 may include a phone or data network. In an embodiment, the user device 110 may connect to an interface (not shown) that may, in turn, pass a task selection or profile request to server 120. The interface may be part of server 120 or a separate device, depending on the implementation of the embodiment. Even when described as coupled to the server, the interface may be considered to be part of the server. The interface may receive communications from the network 122a, validate the communications as coming from a known or compatible source, and then relay the communications to the server 120.

Continuing with the components of example of FIG. 1, server 120 can communicate with the storage medium 130 in one embodiment. The storage medium 130 is a type of computer-readable storage medium, such as a hard drive, memory (such as RAM), and other storage devices (e.g., flash memory, a USB drive, compact disk, DVD, tape, or other media). The data storage medium may be implemented by one or more distinct storage mediums, and may operate as a database in one embodiment. In an embodiment, storage medium 130 is used to store program code and instructions, which when executed, perform various stages of operation and carry out the profiled and/or focused searching. In another embodiment, storage medium 130 maintains and stores user-specific data, for example, user login information, user search history, and user preferences, among other things. Additionally, the data storage medium 130 can store data pertinent to matching litigation information sources to a user's selected litigation task.

An information source, such as sources 140a, 140b, and 140c, can comprise another server, database, and/or computer-readable storage medium. The source can be part of server 120 or located externally from server 120. The sources represent access points for litigation information. In one embodiment, the user device 110 can directly contact at least one of the sources 140a, 140b, and 140c as a stand-alone litigation service. In addition, while some sources are public, other sources can be private, requiring authorized credentials for access.

Although some sources can contain overlapping types of information, the types of litigation information can also differ in an embodiment. For example, a first source can be used to access attorney profile information, while a second source can contain pleadings filed in a particular district. Any existing litigation service can serve as a source, in an embodiment.

Typically, when server 120 receives a task selection from user device 110, server 120 will determine which sources 140a, 140b, and 140c, to query based on which sources likely will yield relevant litigation information. Server 120 can communicate with these sources to retrieve different types of litigation information, each type relevant in some way to the task or profile.

Server-to-source communications occur over at least one network 122b. The location of a source 140a, 140b, or 140c in relation to server 120 can effect the specific network type used. While FIG. 1 illustrates server 120 connecting with three sources 140a, 140b, and 140c over the same network 122b, the system can utilize different networks for different sources in another embodiment. For example, while server 120 might communicate with a first source 140a over a local area network (LAN), it might communicate with a second source 140b over the Internet. In this way, the communications to each source may travel across different networks The networks 122b used to communicate with various sources can also differ from the network 122a utilized by the user 105 in connecting to server 120.

Figure 2A:
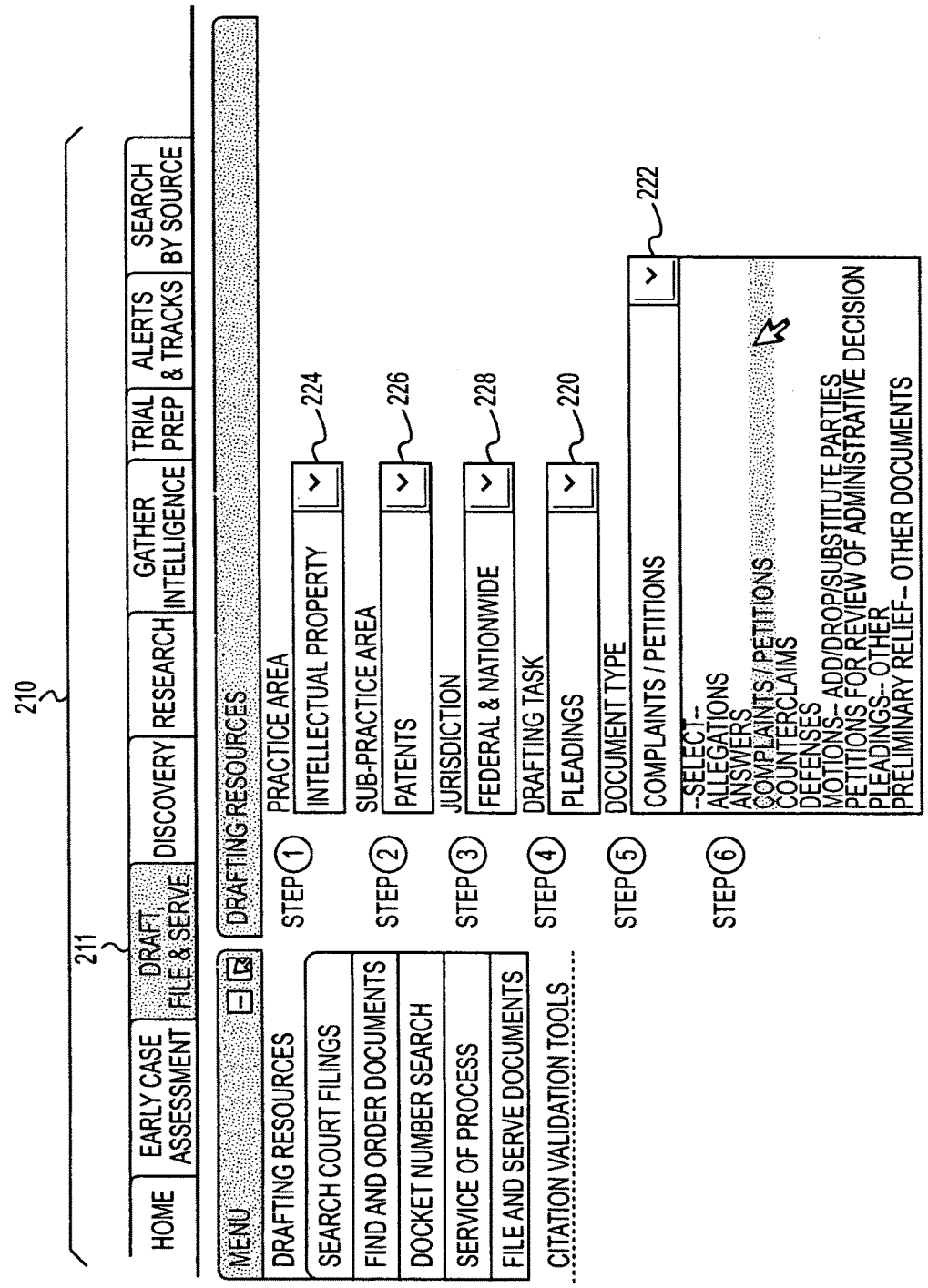
FIGS. 2A and 2B are diagrams of an exemplary screen presented to a user for receiving a litigation task selection from the user in accordance with an embodiment of the present invention.
Figure 2B:
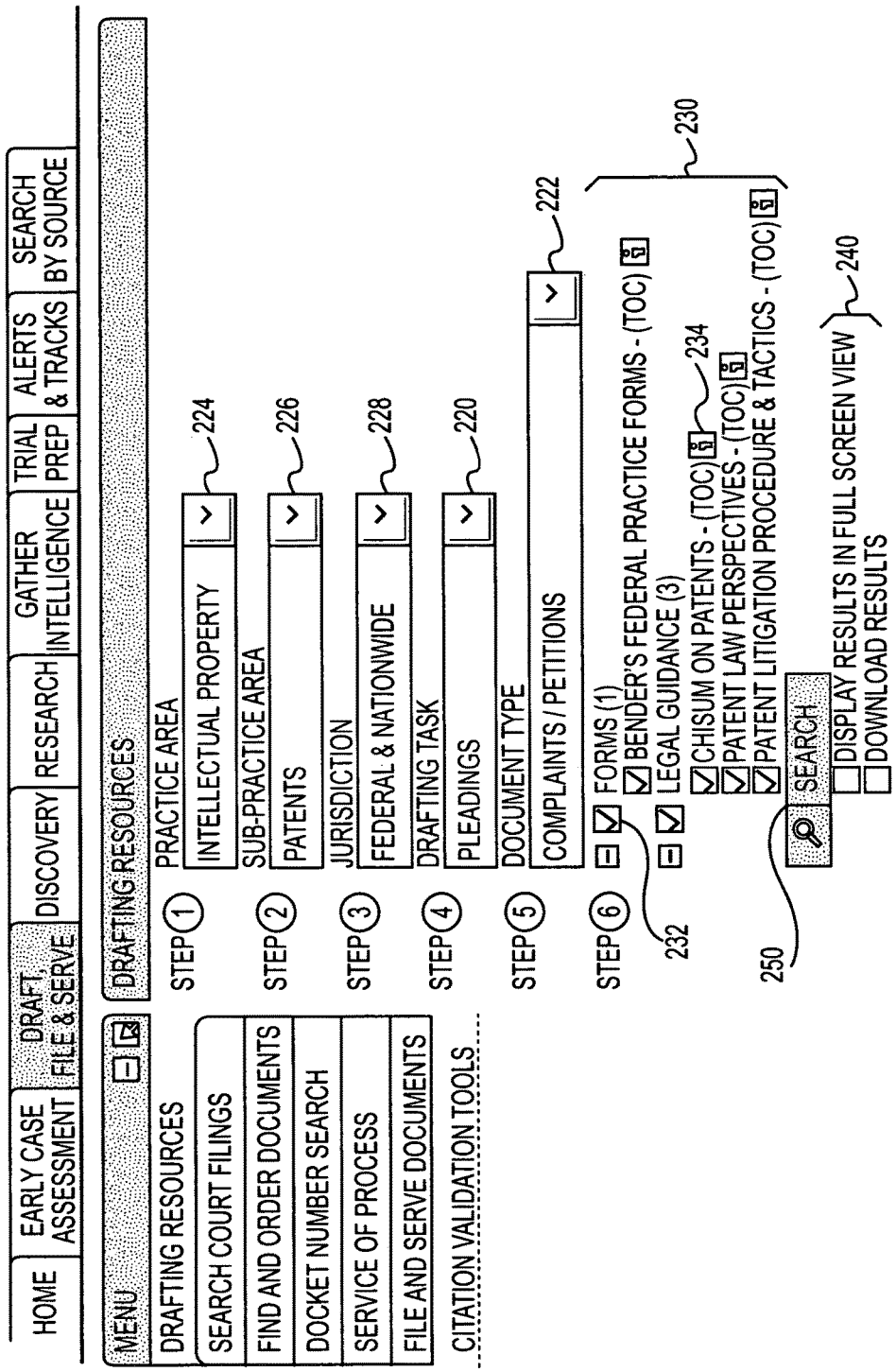
Figure 2C:
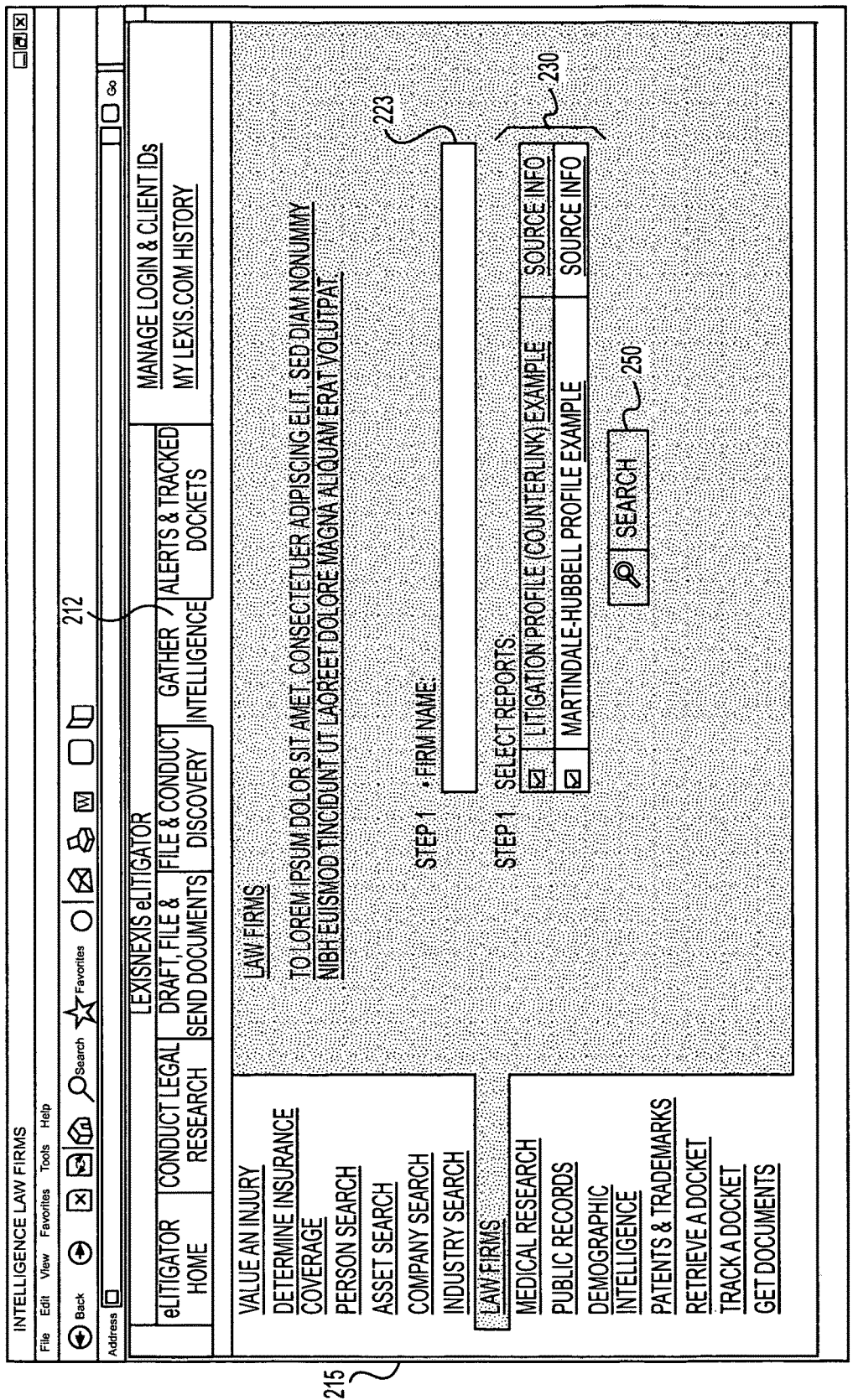
FIG. 2C is a diagram of an exemplary screen presented to a user for receiving a litigation profile request from the user in accordance with an embodiment of the present invention.

FIGS. 2A through 2C are diagrams of an exemplary screens displayed to user 105 on user device 110 during operation of an embodiment of the present invention. In this particular embodiment, the user device 110 displays the screens to the user in a web browser in one embodiment. In another embodiment, a client application operating on the user device 110 displays the screen.

FIG. 2A illustrates a first exemplary screen for selecting a litigation task for use in performing a focused search for litigation information. Examples of a litigation tasks include, but are not limited to, drafting answers, complaints, petitions, counterclaims, defenses, motions, pleadings, requests for preliminary relief, agreements, contracts, briefs (appellate and non-appellate), jury instructions, orders, and other legal work product. In this way, a task selection can indicate a type of work product that the user wishes to create. Because the types of litigation tasks are vast and numerous, in one embodiment the server presents the user with various options to input user selections used for narrowing the task down to a level of specificity that provides more relevant search results.

As illustrated, various tasks can be organized into litigation categories 210. However, each litigation category of the service does not necessarily contain a task-driven search option. For example, a "research" category can instead provide a traditional service for looking up cases or other litigation information, and does not solicit the user's task as an input value. In another embodiment, selecting a category narrows the available tasks down to a sub-category of tasks litigation tasks performed within the selected litigation category.

Continuing with the exemplary screen of FIG. 2A, the user has selected "Draft File and Serve" as the task category. However, some embodiments do not include such categories, and instead allow a user to select a specific litigation task without first choosing a task category.

The manner of selecting the litigation task varies among embodiments. In one embodiment, the user chooses a general litigation task, such as in drop down 220. General litigation tasks include agreements, briefs, pleadings etc. In another embodiment, choosing the litigation task includes an additional step of selecting a specific type of work product the user wishes to produce, such as by using drop down 222. For example, a complaint is a particular work product type that falls within the general litigation task of drafting a pleading. Therefore, in one embodiment, the user can make multiple selections that narrow the task, each one of these selections included as part of the selected task. A task selection, as used herein, can comprise multiple selections made by a user in choosing a particular task.

As shown in FIG. 2A, the server can provide various other options 224, 226, and 228 to the user to help narrow the litigation task even further. Additionally, the additional criteria can allow the server to provide even more focused results to the user by further focusing the search on litigation information that meets additional criteria in one embodiment.

In one embodiment, the user can select the practice area 224 for the litigation task. In addition, one aspect allows the user to specify a further sub-practice area 226.

Because tasks can vary between practice areas, one embodiment may provide a list of tasks for selection by the user based on the practice area selection(s) 224 and 226. For example, whereas the patent law practice area could include infringement contentions, other practice areas might not require this work product. Therefore, the user may be presented with fewer or narrower tasks for selection by the user (i.e., as the user's task selection) by further defining bounds for the task in one embodiment. The server can also use the practice area selection as an additional criterion for querying one or more sources.

Similarly, one embodiment allows the user to select a jurisdiction 228 where the litigation takes place. The task and/or required work product can differ between jurisdictions, because of differences in rules and/or audience. Accordingly, the server can use a jurisdiction selection 228 to further focus the results to include litigation information reflecting those specific rules and/or audience. Selections, such as the jurisdiction selection, may be considered part of the task selection in one embodiment.

In one embodiment, only a task selection is required before the user can perform a search. In another embodiment, the user must select additional criteria (e.g., picking from a list of possible task types) before the task selection is available and before the search is carried out.

FIG. 2B illustrates an exemplary screen presented to the user after the user has made a task selection, in accordance with an embodiment. Referring now to FIG. 2B, the user is presented with some or all potential sources 230 that the server can query, each of the listed sources 230 having litigation information relevant to the selected task. The sources 230 may be categorized or otherwise organized so that the user can more readily comprehend the type of litigation information each source is likely to yield. In this way, the user can select and/or deselect particular sources 230 to further focus the search for the task at hand.

The user may wish to exclude a particular source for a variety of reasons. For example, a source may be duplicative of research already performed for the litigation task.

Alternatively, some sources may be outside the bounds of the user's subscription with one or more litigation services. As a result, some sources may be more expensive than others. In one embodiment, the task search functionality is charged as a flat rate service, regardless of the sources used in searches by the user. In another embodiment, the user is charged per use of the task based search. Each use can incur a flat fee in one embodiment, or the fee can vary based on which of the sources are used in another embodiment.

In the illustrated example of FIG. 2B, the check marks denote sources 230 to include in the search. The user can click the radio buttons to add or remove check marks, which in turn adds or removes the respective source from the search. In addition, the user can select or deselect entire groups of sources at one time. For example, if the user does not need any forms to complete the task 220 (e.g., drafting a complaint), the user can deselect the forms source category 232, and all sources for the forms will be excluded from the search.

One implementation includes information links 234 for each listed source so that the user can access the source and the information it contains prior to running the search. For example, by clicking or moving a pointer over an information link 234, the user may be presented with a summary of the source and/or its contents. In another embodiment, the user can view an example result (e.g., litigation information) from the source to determine if that type of litigation information might be helpful. In this way, a user can decide whether or not to exclude or include particular sources.

In another embodiment, the server stores user preferences so that the user need not continually deselect particular sources each time the user attempts to run a search on a similar task. Such user preference information may also be stored locally with the user in an alternative embodiment. The system can still display the sources to the user, but the previously-deselected sources can default to not be part of the search. The user can select those sources to add them to the list of sources queried in a search.

An embodiment also gives the user options 240 for the display of search results. Such options 240 allow the user to customize retrieval of litigation information results to optimize workflow.

In accordance with one option, the user can choose to download the results. Under that option, each retrieved document (e.g., litigation information) can be saved locally for later viewing and use. This can be particularly useful if the work product is created at a later time, and/or by someone other than the user. Additionally, the user might want to wait until a later time to look through the results, and downloading the results allows the user to do that.

Another option allows the user to determine whether the results will take up the full screen or not. This can be useful for seeing more of the litigation information at once, and determining whether particular results (e.g., litigation information) are helpful. An example results display is discussed in connection with FIG. 2D, below.

FIG. 2C illustrates an exemplary screen for searching litigation information to create a litigation profile for an entity being targeted, such as an expert, litigant, attorney, judge, or law firm. The profiling aspect can be incorporated into the task-based litigation service discussed in conjunction with FIGS. 2A and 2B in one embodiment. For example, profile creation can be considered a task in one embodiment. FIG. 2C illustrates such an embodiment. However, the profiling search can also act as a stand-alone litigation service in a different embodiment.

Continuing with FIG. 2C, a law firm profile search interface is illustrated as integrated within a task-based litigation service in accordance with an embodiment of the present invention. The user selects the "gather information" litigation category 212, and, in this example, a "law firms" subcategory 215. Categorization techniques, when available at all, can vary between embodiments.

In one embodiment, the server may display various sources 230 of litigation information relevant to the profile, prior to the user executing the search. The user may select and/or deselect sources to indicate which sources are included in the search, as discussed with reference to FIG. 2B, above.

The interface provides a field 223 for receiving the name of the applicable expert, litigant, attorney, judge, or law firm. In some embodiments, separate fields are used for first and last names, or other purposes.

Although not shown in FIG. 2C, one embodiment allows the user to select additional criteria. The user can specify a jurisdiction and/or practice area, so that the profile results are more focused. For example, the user can search for all filings by a particular law firm within a particular jurisdiction in a litigation falling under a particular practice area. This kind of focused searching allows the user to efficiently interact with the server, which creates a valuable profile of relevant past activities by an entity targeted as involved in the litigation.

When the user has focused the search to their liking, the user executes the search, such as by clicking button 250.

Figure 2D:
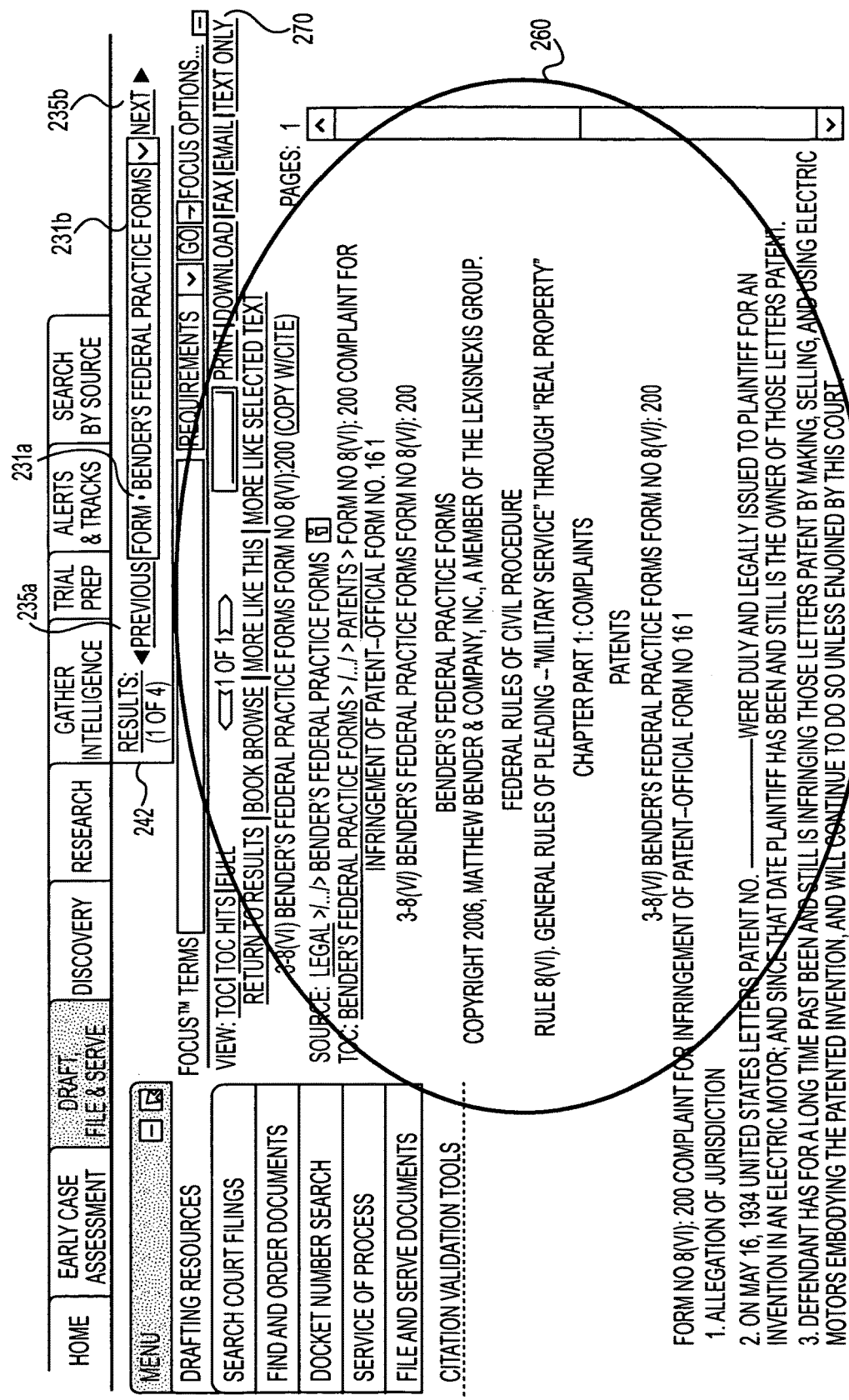
FIG. 2D is a diagram of an exemplary screen presented to a user for displaying results for a task-based search and/or litigation profile in accordance with an embodiment of the present invention.

FIG. 2D is an exemplary illustration of a results screen in accordance with an embodiment of the present invention. After the user executes a search, as described with reference to FIGS. 2A through 2C, the user receives litigation information relating to the selected task and/or profile request.

For results of a profile requested search, the created litigation profile is transmitted to the user in a variety of formats depending upon the targeted entity. For example, an attorney or law firm profile can allow the user (or some other person) to evaluate trends in previous arguments made by a specific opponent. Additionally, the user can discern the opponent's experience and/or success level with regards to a particular issue, practice area, jurisdiction, or judge. An expert profile can show the user (or some other person) positions taken by the expert on a particular issue or on cases with similar facts, in a particular jurisdiction or before a particular judge. In this way, the user can more easily determine ways to attack an expert's testimony and gauge where the expert has had success or failed in the past. A judge profile allows a user to easily organize litigation information for use in determining a judge's experience on a particular litigation issue.

The user can view each piece of litigation information, such as the form 260 illustrated in FIG. 2D, by navigating through the results in one embodiment. In the illustrated example, the user can use links 235a and 235b to move between results. The interface can also display the user's current location 242 within the results.

The litigation information can also include one or more links for electronically filing the work product associated with the task.

In one embodiment, the results are ordered according to their projected relevance relative to the task. For example, a form and a filing rule may be arranged before filing statistics for that jurisdiction. This is because, while the filing statistics are helpful, the form of the filing and rules for doing so are projected to be more important.

The interface can display a description of the currently-viewed litigation information in one embodiment. As shown in FIG. 2D, the server can display the type of litigation information 231a to the user, along with the source 231b of the litigation information. This allows a user to gauge which types and sources of litigation information are useful for the given task. As a result, the user can gauge if they should include or exclude particular sources in the future.

The results interface can also include additional options 270 for optimizing workflow and/or saving the results. While FIG. 2D includes options to print, download, fax, and email the litigation information, any combination of known techniques for storing litigation information is possible.

Additionally, one embodiment can present only a portion of the retrieved litigation information if the server determines that other portions of the document are irrelevant to the user's task. In that embodiment, the server can provide an additional option to the user for displaying the entire document.

In one embodiment, the interface includes a link to an Electronic Filing System (EFS) related to the drafting task. The link can be sent (e.g., transmitted and/or displayed) by the server after receiving a task selection in one embodiment. In another embodiment, one or more EFS links are provided to the user irrespective of the task selection.

The EFS may be used to filed documents with a court, serve the documents on opposing counsel, and/or otherwise electronically transmit a copy of the document to be filed and/or served to one or more entities.

Other interfaces and layouts are also possible. FIGS. 2A through 2D are only exemplary, and do not restrict the way in which the embodiments present the interface to the user.

Figure 3A:
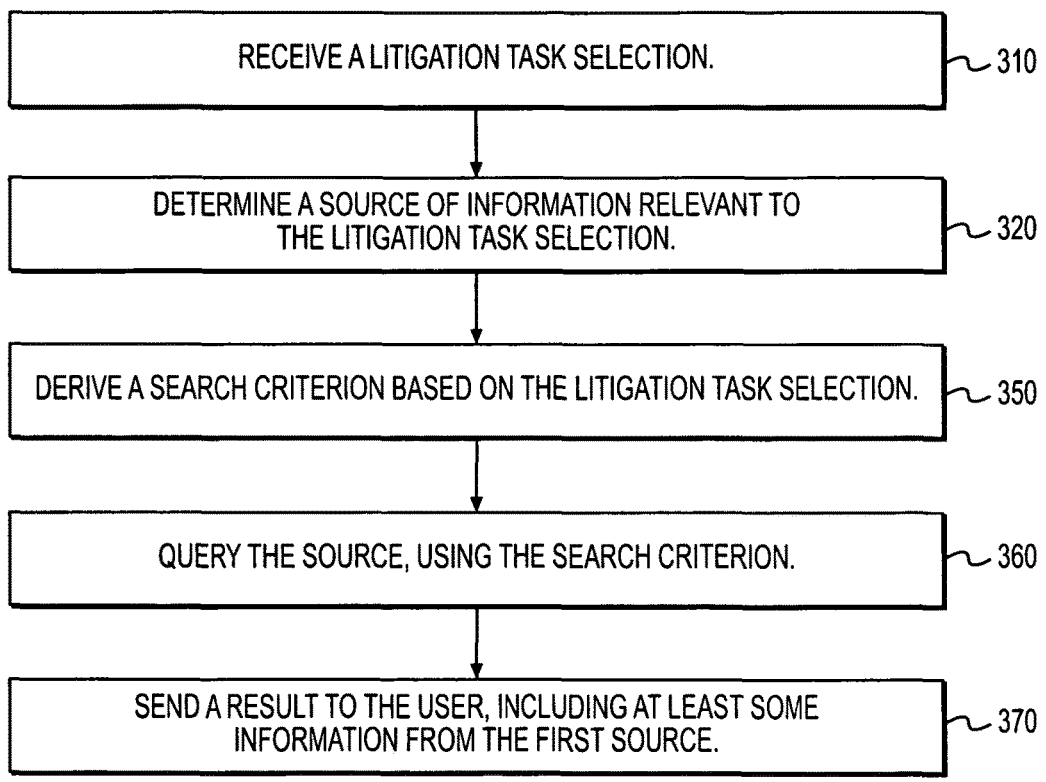
FIGS. 3A and 3B are exemplary flow charts that include steps taken by a server to provide litigation information to a user based on a task selection in accordance with an embodiment of the present invention.
Figure 3B:
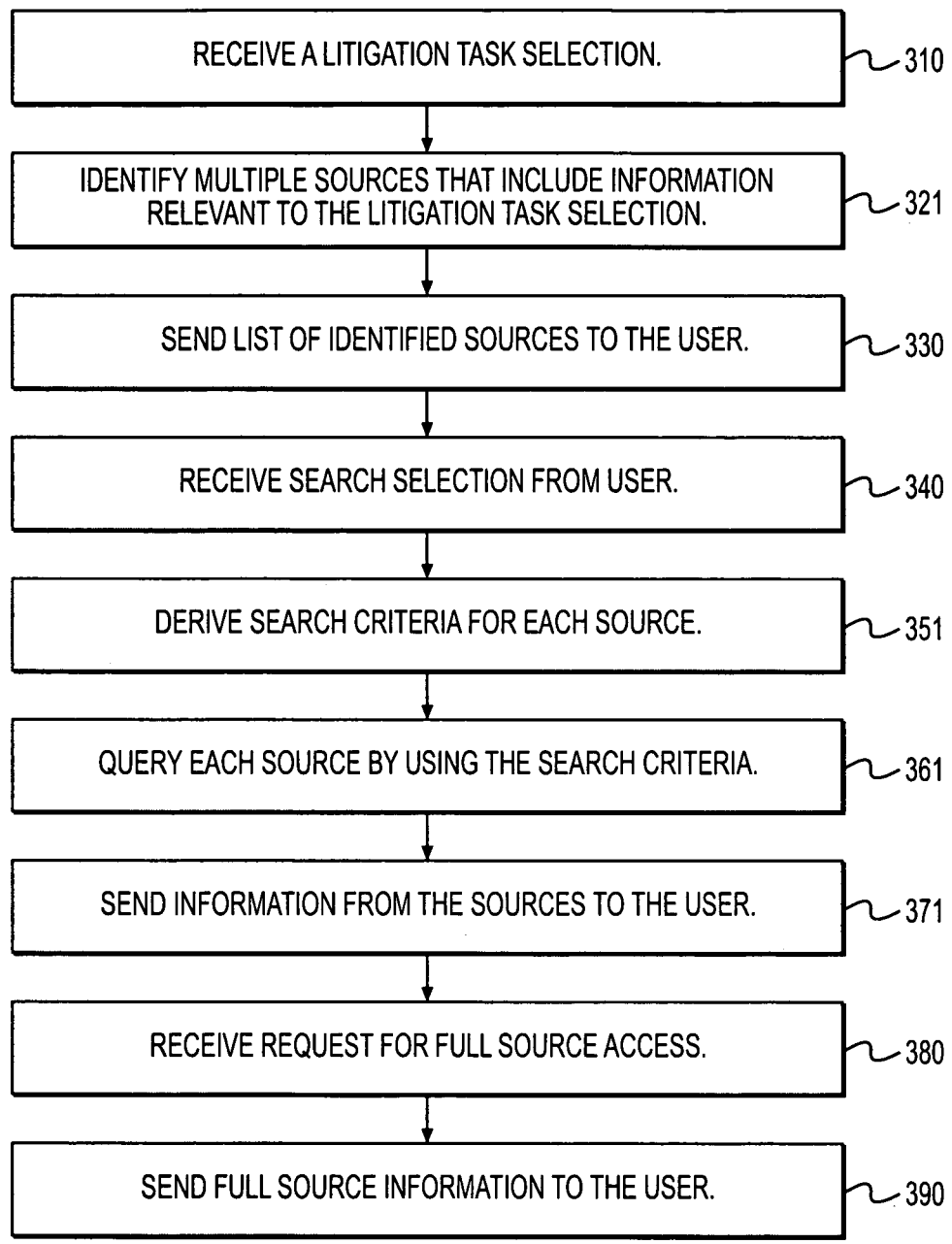
Figure 3C:
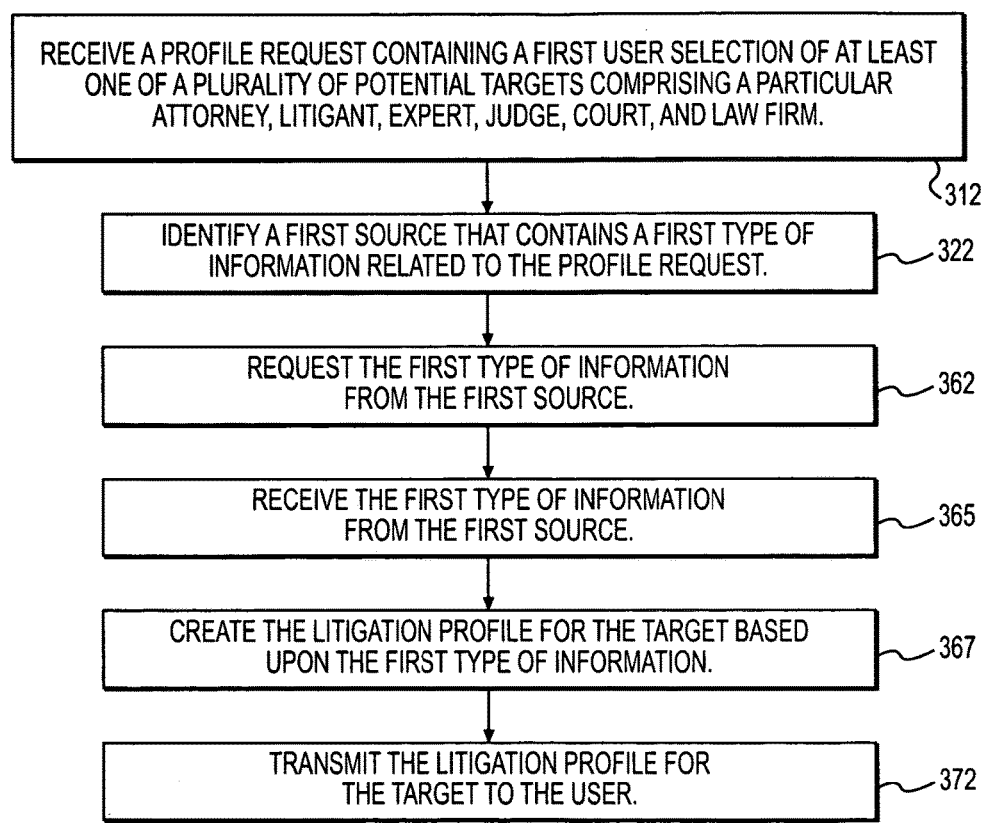
FIG. 3C is an exemplary flow chart that includes steps taken by a server to provide a litigation profile to a user for a particular targeted litigant, attorney, law firm, or judge in accordance with an embodiment of the present invention.

FIGS. 3A through 3C list exemplary steps taken by a server (and/or stages executed by a processor) to process a litigation information request and send results to the user in accordance with an embodiment of the present invention. FIGS. 3A and 3B are directed to embodiments that perform task-focused searches, whereas FIG. 3C is an exemplary flow chart for a profile search.

As illustrated in these Figures, some embodiments utilize more steps than others. While both FIGS. 3A and 3B explain steps for task-based searches, FIG. 3B describes a slightly more complex embodiment than FIG. 3A. However, FIGS. 3A through 3C are only illustrative. The inclusion or exclusion of one or more steps in these Figures does not restrict the methods contemplated within various embodiments for performing focused litigation information searches herein.

As illustrated in FIGS. 3A and 3B, the server receives a litigation task selection from the user at step 310. In general, the user device contacts the server to carry out step 310. The server receives the selection in response to the user selecting a task on the user device. In one embodiment, the server provides a list of selectable types of tasks. In another embodiment, the tasks are programmed into a client application. In yet another embodiment, the user interface may adjust the available tasks without interacting with the server.

While step 310 can be accomplished by simply receiving a single user selection from the user device, the interaction may be more complex in some embodiments. For example, in one embodiment, when the user selects any criteria that tends to narrow or focus the task in any way, the user device may contact the server to obtain an updated list of possible tasks or to update other task related options. The user may go through several iterations of selecting criteria to focus the search, and therefore receiving the task selection may be the actual result of several different interactions between made between the user device and the server.

Therefore, embodiments of the present invention contemplate one or more contacts or interactions with the server in order for the server to receive a litigation task selection.

The litigation task selection can be received as one or more data values. In one aspect, the task selection can include a litigation category, a task type, and a document type. Alternatively, it can include only a task type, or only a document type. For example, the litigation category can be "filings," the task type can be "pleadings," and the document type can be a counterclaim.

In one embodiment, the server also receives authentication information from the user at step 310. This allows for verification of the user's subscription to the litigation service.

In another embodiment, the user must first log in to the server before being presented with the option to gather litigation information. The login can be managed via any known technique, and the login information may remain persistent for some time period and/or until the user closes the browser.

After receiving the litigation task selection at step 310, the server determines a source of information relevant to the task selection at step 320. As shown in step 321 of FIG. 3B, the server can identify multiple sources that include relevant information.

In one embodiment, the server can use each criterion supplied by the user to further focus the search results. For example, the server can track which sources have relevant information for a particular jurisdiction. If the user selects a jurisdiction, then the server can eliminate some sources based on that selection. The remaining sources are identified by the server as including information relevant to the litigation task selection.

Identifying the source(s) can include the use of a database in one embodiment. For example, the criteria supplied by the user can serve as inputs to a stored procedure or other database routine that returns a list of relevant sources based on the supplied criteria. The database schema and complexity for determining one or more sources based on the user's task selection can vary between embodiments.

In another embodiment, the sources are chosen by using programmed logic instead of, or in addition to, a database. The program logic can check the selected litigation task, such as by using if/then logic or comparing via a case statement, and then return the list of sources that correspond to the selected task. In more elaborate embodiments, such as when the task selection comprises multiple user selections, multiple levels of comparison can be used.

The correspondence between the sources and the task selections (and other user-selected criteria) is predefined by an administrator of the legal service in one embodiment. As sources change in time, the administrator can alter the source lists so that the server can continue to accurately identify helpful sources based on the task selection.

At step 350, the server derives a search criterion based on the litigation task selection. The criterion is used to query the identified source in step 360. Consequently, this step is performed in conjunction with step 360 in one embodiment.

In one embodiment, the criterion can depend largely on the requirements of the source. The server generally offers criteria understood by the source so that the source can carry out the query. If the provider of the litigation services also controls the source, then the server can interact with the source in any manner that the service provider decides appropriate. For example, the server may be able to directly access the litigation information using an interface designed specifically for the task-based service.

In one embodiment, the server can query an external source. In that embodiment, the server derives a search criterion (or criteria, as in step 351 of FIG. 3B) that matches the criterion required by the external source. Even if the source is not under control of the litigation provider, the third party can create an interface for access by the server. Otherwise, the server can connect to the source in the manner than any individual would connect to the source. This can include submitting login information, and automatically selecting a search criterion based on the user's litigation task selection.

At step 360, the server queries the source, using the search criterion. As explained in conjunction with the previous step, in one embodiment, the server queries the source by directly accessing the backend (e.g., database) of the source. In another embodiment, the server queries the source by submitting criteria to the source, which in turn runs a query for the litigation information.

At step 370, the server sends a result to the user. The result can include at least one piece of litigation information, and can include a plurality of different documents. Sending the results can include populating a web page or graphical interface, uploading the information to the user, or making the information available for download.

FIG. 3B lists additional steps undertaken by the server in one embodiment. As shown in FIG. 3B, the server sends a list of the identified sources to the user at step 330. Step 330 is not offered in all embodiments, such as the example described in FIG. 3A.

A list of sources can help a user to focus their search by excluding sources the user deems unhelpful. In one embodiment, the server also sends information describing the sources to the user. For more on the user process of selecting sources, see the discussion related to FIG. 2B, ref. 230, above.

After the user selects which sources to search (or decides to use the suggested set of sources), the server receives the search selection at step 340. In one embodiment, each time the user selects or deselects a source, the server is updated. In another embodiment, the server receives the search selection when the user performs some other action, such as hitting the search button.

Additionally, an embodiment includes a server that can query multiple sources at 361. In doing so, the server may derive criteria for each source at step 351, and the criteria for each source may vary in some embodiments.

In one embodiment, the server provides only some of the litigation retrieved from the source to the user. This can occur, for example, when the source determines that only a portion of the litigation information is relevant to the selected task. Therefore, at step 371 the server sends information from the sources to the user, but does not necessarily send all the information retrieved from the sources.

In such an embodiment, the user can request full source access to view the full results. In one aspect, full source access includes requesting the withheld information from the server. In another aspect, full source access includes linking directly to the source for further querying of the source by the user. In yet another aspect, the user receives the full results but the user interface does not display the full results. Therefore, requesting full source access does not require further server intervention, and the user interface can expand the displayed results based on the full set of information already received.

As step 380, the server can receive the user's request for full source access. In one embodiment, the server responds by sending full source information to the user at step 390.

In another embodiment, the server responds by launching a web interface (or manipulating the existing interface) to display an access point for the source information. The access point can be, for example, an existing graphical interface used to access that particular source without regard to the task-based litigation service. The user can then perform searches on the source independently from the task-based litigation service in one embodiment.

FIG. 3C lists exemplary steps performed by a server (or stages executed by a processor) in running a profile search. A task selection can include a profile request in one embodiment. In another embodiment, the server can accept a profile request independently of the task-based litigation service.

At step 312, the server receives a profile request containing a first user selection of at least one of a target, such as a particular litigant, attorney, expert, judge, court, and law firm. The request can include more than one of the entities, such as a profile of a law firm's activities before a particular judge.

At step 322, the server identifies a first source that contains a first type of information related to the profile request. For example, the first source could have background information about the entity, such as an attorney's bar status.

Other sources can be identified that contain different types of litigation information as compared to the first source.

At step 362, the server requests the first type of information from the first source. This request can include querying the first source. Query parameters can include the profile selection and/or additional criteria, such as jurisdiction, chosen by the user.

At step 367, the server creates the litigating profile for the target based on the first type of information. In one embodiment, the litigation profile includes the first type of information as it was retrieved. In another embodiment, the litigation profile is created by formatting the first type of information in a particular way. For example, the name of the entity and particular statistics could be arranged in a set format on the first page, while additional data follows on subsequent pages. In another embodiment, the arrangement or inclusion of information in the profile is partially or fully based on the type of information.

At step 372, the server transmits the litigation profile to the user. Transmitting can include populating a web page or graphical interface, uploading the information to the user, or making the information available for download.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for improving computer-based search accuracy by conducting electronic task-based searching of litigation information and for providing an improved unified interface that includes specific litigation information from a plurality services together, comprising the steps of:

receiving, at a server, a task selection from a user via a profile search interface integrated within a task-based litigation service website, the task selection indicating a particular target and a type of work product that the user wishes to create, as well as a set of criteria associated with the task selection, the task selection being chosen from a plurality of different tasks and the particular target being chosen from a group consisting of a litigant, an attorney, a judge, a court, a law firm, and an expert witness;

in response to receiving the task selection, identifying a first electronic database for retrieving a first type of litigation information related to the task selection, the first electronic database being identified among a plurality of electronic databases, at least some of the plurality of electronic databases containing different types of litigation information, each of the electronic databases located at a separate physical location from another of the plurality of electronic databases, the first electronic database being located at a first physical location external to the server, wherein each of the electronic databases includes a database server that is separate from the server that receives the task selection;

requesting the first type of litigation information from the first electronic database;

receiving the first type of litigation information from the first electronic database;

identifying a second electronic database for retrieving a second type of litigation information related to the task selection, the second electronic database containing a different type of litigation information than the first electronic database, the second electronic database being located at a second physical location external to the server that is different than the first physical location;

requesting the second type of litigation information from the second electronic database;

receiving the second type of litigation information from the second electronic database;

creating a litigation profile for the particular target, the litigation profile comprising a set of documents received from the first electronic database and the second electronic database, wherein each document in the set of documents relays the target's position on one or more of a particular issue, a practice area, and a jurisdiction; and displaying, to the user within the profile search interface of the task-based litigation service website, the profile search interface including a result comprising the litigation profile and the set of documents, wherein at least one document from the set of documents is from the first electronic database and at least one other document from the set of documents is from the second electronic database, and wherein the set of documents are ordered within the profile search interface of the task-based litigation service website according to each document's projected relevance to the task selection.

2. The method of claim 1, wherein the first type of litigation information and the second type of litigation information are ordered based on projected relevance.

3. The method of claim 1, wherein requesting the first type of litigation information from the first electronic database comprises contacting the first electronic database over a network.

4. The method of claim 1, wherein:

prior to receiving the task selection from the user, the method comprises receiving a litigation category from the user and directing the user to a set of litigation tasks associated with the litigation category chosen by the user; and the set of criteria consists of one or more options chosen from the group consisting of a practice area, sub-practice area, and jurisdiction.

5. The method of claim 1, further comprising: identifying the first electronic database to the user.

6. The method of claim 5, wherein identifying the first database to the user occurs before requesting the litigation information from the first database, such that the user can select whether to request litigation information from the first electronic database.

7. The method of claim 5, wherein identifying the first electronic database to the user provides the user with a link with which to access the first electronic database.

8. The method of claim 1, wherein requesting the first type of information from the first electronic database includes sending a first and second criterion to the first electronic database, the first criterion derived from the task selection, and the second criterion selected by the user.

9. The method of claim 8, wherein the second criterion is selected from a group comprising a practice area and jurisdiction.

10. The method of claim 1, further comprising providing a plurality of task categories, each task category corresponding to at least one task within the plurality of different tasks, wherein the task categories include at least one from the group comprising case assessment, drafting, discovery, research, profiling, and trial preparation.

11. The method of claim 1, wherein the task selection includes a plurality of user selections.

12. The method of claim 1, wherein the litigation information transmitted to the user includes a link to an electronic filing system associated with the task selection.

13. A computer system that exhibits increased search accuracy by providing task-based litigation information to a user and provides an improved unified interface that includes specific litigation information from a plurality of sources together, the computer system comprising:
- a storage medium for storing user preferences;
- a server in communication with the storage medium; and
- a profile search interface integrated within a task-based litigation service website and coupled to the server and a network, wherein the profile search interface receives a litigation task selection from a user over the network, the task selection indicating a particular target and a type of work product that the user wishes to create, the task selection being chosen from a plurality of different tasks and the particular target being chosen from a group consisting of a litigant, an attorney, a judge, a court, a law firm, and an expert witness,
- wherein the server is operative to receive the litigation task selection through the interface and, in response, utilize the request to:
  - determine a first electronic database for retrieving a first type of litigation information relevant to the litigation task selection, the first electronic database being identified from amongst a plurality of electronic databases that store various types of information, each of the electronic databases located at a separate physical location from another of the plurality of electronic databases, the first electronic database being located at a first physical location external to the server, wherein each of the electronic databases includes a database server that is separate from the server that receives the task selection;
  - identify a second electronic database for retrieving a second type of litigation information related to the task selection, the second electronic database containing a different type of litigation information than the first electronic database, the second electronic database being located at a second physical location external to the server that is different than the first physical location;
  - derive a first search criterion based on the litigation task selection;
  - derive a second search criterion from the litigation task selection;
  - query the first electronic database by using the first search criterion;
  - query the second electronic database by using the second search criterion;
  - create a litigation profile for the particular target, the litigation profile comprising a set of documents from the first electronic database and the second electronic database, wherein each document in the set of documents relays the target's position on one or more of a particular issue, a practice area, and a jurisdiction; and
  - display a result to the user within the profile search interface of the task-based litigation service website, the result comprising the litigation profile and at least some information from the first and second electronic databases.

14. The system of claim 13, wherein:
the litigation task selection includes a selection of a document type from a group comprising answers, briefs, complaints, petitions, counterclaims, defenses, motions petitions for review pleadings, and preliminary relief; and
the system further includes a category interface comprising a set of litigation categories for presentation to the user; and
upon receipt of a litigation category from the user, the server presents the user with a litigation task interface associated with the litigation category selected and generates the result based upon the litigation task selected by the user.

15. The system of claim 13, wherein the result includes a link to an electronic filing system for filing an electronic document associated with the litigation task selection.

16. The system of claim 13, wherein the server is further operative to:
- identify the first and second electronic databases to the user; and
- receive a user selection indicating which of the first and second electronic databases to query.

17. The system of claim 16, wherein identifying the first and second electronic databases to the user includes applying the user preferences in supplying an initial indication of which of the first and second electronic databases will be queried.

18. A non-transitory, computer-readable medium for improving computer-based search accuracy, the non-transitory, computer-readable medium containing instructions for execution by a processor, the instructions causing the processor to perform stages for a task-based electronic search and provide an improved unified interface that includes specific litigation information from a plurality of services, the stages comprising:
- receiving, at a server, a litigation category from a user via a profile search interface integrated within a task-based litigation service website;
- sending the user, from the server, an interface to choose a task from a set of task selections derived from the litigation category;
- receiving, at the server, a task selection from the user, the task selection indicating a particular target and a need to create a work product related to a particular part of litigation, wherein the particular target being chosen from a group consisting of a litigant, an attorney, a judge, a court, a law firm, and an expert witness;
- in response to receiving the task selection, identifying a first electronic database of information useful in creating the work product, the first electronic database being identified from amongst a plurality of electronic databases that store different types of information, each of the plurality of electronic databases including an electronic database that is physically separate from another of the plurality of electronic databases, the first electronic database being located at a first physical location external to the server, wherein each of the physical databases includes a database server that is separate from the server that receives the task selection;
- identifying a second electronic database of information useful in creating the work product, the second electronic database containing a different type of litigation information than the first electronic database, the second electronic database being located at the second physical location external to the server that is different from the first physical location;
- querying the first electronic database using the first criterion derived from the task selection;

querying the second electronic database using a second criterion derived from the task selection;

creating a litigation profile for the particular target, the litigation profile comprising a set of documents received from the first electronic database and the second electronic database, wherein each document in the set of documents relays the target's position on one or more of a particular issue, a practice area, and a jurisdiction; and displaying to the user within the profile search interface of the task-based litigation service website, the profile search interface including a result comprising the litigation profile and the set of documents, wherein at least one document from the set of documents is from the first electronic database and at least one other document from the set of documents is from the second electronic database, wherein the documents are ordered within the profile search interface of the task-based litigation service website based upon their relevance to the task selection.

19. The non-transitory, computer-readable medium of claim 18, wherein the first electronic database includes profile information and the criterion focuses the querying on at least one from a group comprising a practice area, jurisdiction, and document type.

20. The method of claim 1, wherein the litigation profile shows a position taken by the target on an issue in a past litigation.

21. The method of claim 1, wherein the past testimony is related to a particular legal issue in a past litigation, and wherein the second type of litigation information indicates the legal outcome regarding the particular legal issue.

* * * * *